(No Model.)

H. H. THIELLESEN.
ANIMAL TRAP.

No. 463,011. Patented Nov. 10, 1891.

WITNESSES:
Donn Twitchell
C. Sedgwick

INVENTOR
H. H. Thiellesen
BY Munn & Co.
ATTORNEYS

THE NORRIS PETERS CO., PHOTO-LITHO., WASHINGTON, D. C.

UNITED STATES PATENT OFFICE.

HANS H. THIELLESEN, OF CUSTER CITY, SOUTH DAKOTA.

ANIMAL-TRAP.

SPECIFICATION forming part of Letters Patent No. 463,011, dated November 10, 1891.

Application filed February 10, 1891. Serial No. 380,894. (No model.)

*To all whom it may concern:*

Be it known that I, HANS H. THIELLESEN, of Custer City, in the county of Custer and State of South Dakota, have invented a new and Improved Animal-Trap, of which the following is a full, clear, and exact description.

The object of the invention is to provide a new and improved animal-trap which is simple and durable in construction, very effective in operation, and arranged to reset itself after an animal is trapped.

The invention consists of a mirror arranged to reflect the bait and located next to a counterbalanced trap-door.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in both the figures.

Figure 1:
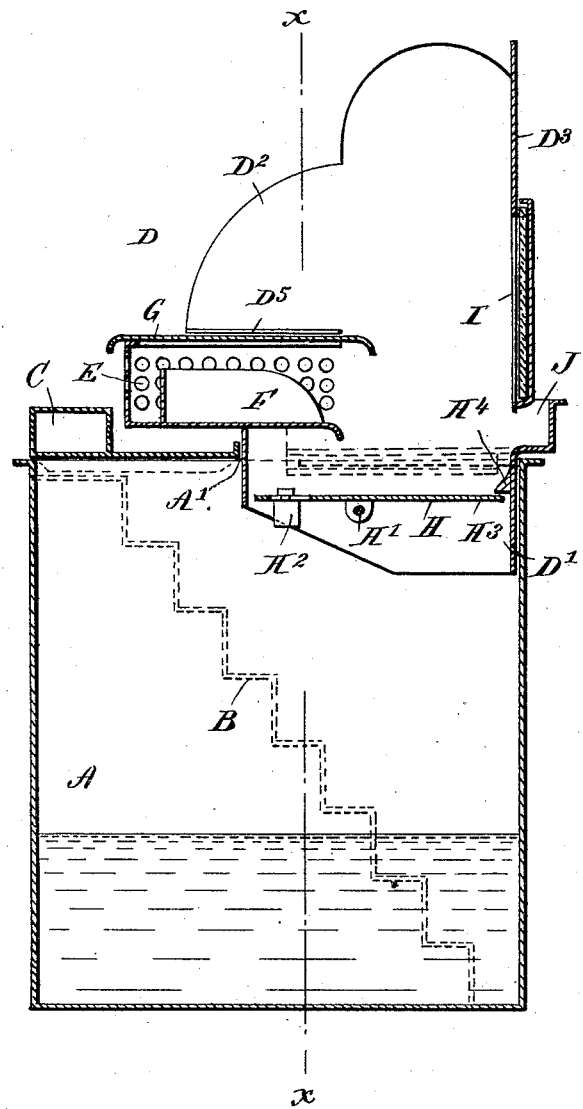
Figure 2:
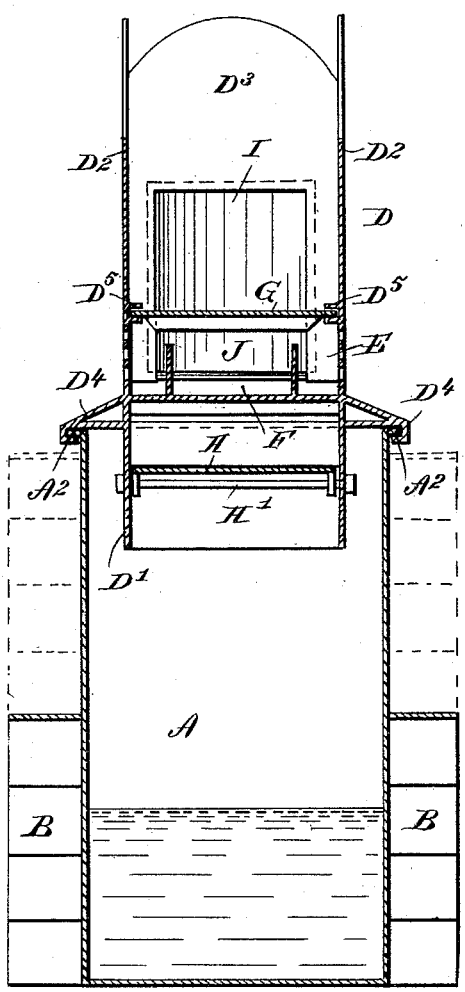

Figure 1 is a sectional side elevation of the improvement, and Fig. 2 is a transverse section of the same on the line $x\ x$ of Fig. 1.

The improved animal-trap is provided with a suitable receptacle A, on the sides of which are formed steps B to permit the animal to pass to the top of the receptacle A on a transverse platform C.

In the top of the receptacle A is formed an opening A', into which fits an open extension D' of a frame D, formed with upwardly-extending sides $D^2$ and a back $B^3$, which latter is in line with one end of the receptacle A. On the sides $D^2$ are formed guideways $D^4$, adapted to engage flanges $A^2$, formed on the sides of the receptacle A to permit of conveniently detaching the frame D from the receptacle A whenever desired.

In the front part of the frame D, next to the platform C and between the sides $D^2$, is arranged a perforated box E, provided with a bait-receptacle F, open at the rear, as is plainly shown in Fig. 1. The top of the box E is provided with a removable lid G, fitted to slide in suitable guideways $D^5$, formed on the inside of the sides $D^2$ of the frame D. The cover or lid G has its ends slightly bent downward, as is plainly shown in Fig. 1, the said cover serving as a gangway for the animal. In the open extension D' of the frame D is arranged a counterbalanced trap-door H, fulcrumed on a rod H', extending transversely in the said extension D'. The trap-door H extends, with its weighted end $H^2$, partly under the perforated box E, while its free end $H^3$ is adapted to abut against the projection $H^4$, secured to the rear end of the extension D'. The weighted end $H^2$ holds the trap-door H in a horizontal position, with the free end $H^3$ resting against the projection $H^4$. The bottom of the perforated box extends with its inner edge above the pivot H' of the trap-door H, and in a similar manner the inner edge of the lid or cover G extends likewise, so that an animal passing over the said lid or cover drops onto the free end of the trap-door H, so that the latter, with its free end, swings downward to precipitate the animal into the receptacle A.

In the back $D^3$ of the frame D is arranged a transversely-extending mirror or looking-glass I, arranged so as to reflect the bait in the bait-receptacle F to the animal passing from the platform C onto the lid or cover G and over the same. Below the mirror I is arranged a small bait-box J, extending transversely and visible to the animal from the inner edge of the lid or cover G.

The operation is as follows: The operator by removing the lid or cover G can conveniently place a suitable bait in the receptacle F. A small piece of bait is placed into the receptacle J from the outside of the frame D. The cover G is then again placed in position. The animal smells the bait in the bait-box F, and is attracted thereby to finally pass up the steps B onto the platform C, and from the latter onto the lid or cover G. The animal in looking forward sees its own image reflected by the mirror I and also the bait in the bait-box F. The picture thus reflected appears to the animal to be a rival going for the bait, and the animal in its greedy nature jumps for the supposed reflected bait and the bait in box J, but lands on the trap-door H, which opens and precipitates the animal into the receptacle A. The latter may be filled with water to drown the trapped animal. As soon as the animal has passed the trap-door H, the latter swings back to its normal position and the trap is thus reset for another victim.

Having thus described my invention, I claim as new and desire to secure by Letters Patent—

1. A trap comprising a receptacle having a counterbalanced trap-door in its top, a mirror above the downward-swinging end of the trap-door, and a perforated bait-box E in front of the mirror and open at its inner end to permit its contents to be reflected in said mirror, substantially as set forth.

2. In an animal-trap, the combination, with a receptacle, of a frame set on the said receptacle and provided at its bottom with a trap-door, a bait-box open at its inner end arranged in the said frame and having its cover forming a gangway for the animal, and a mirror arranged opposite the bait-box and located over the free end of the said trap-door, substantially as described.

3. In a trap, the frame D to rest on top of a vessel and having an open depending extension, a counterbalanced trap-door in said extension, the mirror on the rear wall of the frame above the trap-door, the perforated bait-box E in front of the mirror and open at its inner end, and a cover for said box forming a gangway for the entrance of the animal, substantially as set forth.

4. In an animal-trap, the combination, with a frame adapted to be supported on a receptacle, of a counterbalanced trap-door pivoted in the bottom of the said frame extending horizontally and adapted to swing with its free end downward to open the way into the receptacle, a bait-box arranged in the said frame above and in front of the weighted end of the said trap-door, and a mirror arranged opposite the said bait-box and located above the free end of the said trap-door, substantially as described.

5. In an animal-trap, the combination, with a frame adapted to be supported on a receptacle, of a counterbalanced trap-door pivoted in the bottom of the said frame extending horizontally and adapted to swing with its free end downward to open the way into the receptacle, a bait-box arranged in the said frame above and in front of the weighted end of the said trap-door, a mirror arranged opposite the said bait-box and located above the free end of the said trap-door, and a second smaller bait-box located under the said mirror, substantially as described.

HANS H. THIELLESEN.

Witnesses:
FRED. WIEHE,
CARL RASMUSSEN.